(12) United States Patent
Hunt

(10) Patent No.: US 6,714,568 B2
(45) Date of Patent: Mar. 30, 2004

(54) ACTIVE OPTICAL SYSTEM FOR BEAM-STEERING A LASER BEAM

(75) Inventor: Jeffrey H. Hunt, Chatsworth, CA (US)

(73) Assignee: The Boeing Company, Chicago, IL (US)

(*) Notice: Subject to any disclaimer, the term of this patent is extended or adjusted under 35 U.S.C. 154(b) by 201 days.

(21) Appl. No.: 09/978,821

(22) Filed: Oct. 15, 2001

(65) Prior Publication Data

US 2003/0091073 A1 May 15, 2003

(51) Int. Cl.$^7$ ................................. H01S 3/10
(52) U.S. Cl. ............................. 372/21; 372/27
(58) Field of Search .................... 350/285; 385/8; 359/316; 372/21, 27

(56) References Cited

U.S. PATENT DOCUMENTS

| | | | |
|---|---|---|---|
| 4,157,861 A | | 6/1979 | Davies .................... 350/285 |
| 4,837,044 A | * | 6/1989 | Murarka et al. ............. 427/10 |
| 4,869,579 A | * | 9/1989 | Fischer et al. ............. 359/299 |
| 4,960,322 A | * | 10/1990 | Khoshnevisan et al. ..... 359/305 |
| 5,033,057 A | * | 7/1991 | Bosenberg et al. .......... 372/72 |
| 5,061,048 A | * | 10/1991 | Hayden et al. ............. 359/315 |
| 5,067,829 A | | 11/1991 | Jaskie et al. ................ 385/8 |
| 5,220,451 A | * | 6/1993 | Gotoh et al. .............. 359/251 |
| 5,420,875 A | | 5/1995 | Sternklar |
| 5,943,159 A | | 8/1999 | Zhu ......................... 359/316 |
| 6,137,926 A | | 10/2000 | Maynard .................... 385/18 |

FOREIGN PATENT DOCUMENTS

| | | | |
|---|---|---|---|
| EP | 0 466 477 A2 | 1/1992 | |
| JP | 406021555 A | * 1/1994 | ...... 372/9 |

OTHER PUBLICATIONS

Cada M et al: "Ultrafast, large angle, noncollinear, and nonlinear, broadband multilayer deflectors" Applied Physics Letters, American Institute of Physics, New York, US vol. 62, No. 5, Feb. 1, 1993, pp. 440–442.

Chowdhury A et al: "Simultaneous optical wavelength interchange with a two–dimensional second–order nonlinear photonic crystal" Optics Letters, Jun. 1, 2000, Opt. Soc. America, USA, vol. 25, No. 11, pp. 832–834.

* cited by examiner

*Primary Examiner*—Paul Ip
*Assistant Examiner*—Phillip Nguyen
(74) *Attorney, Agent, or Firm*—Ingrassia Fisher & Lorenz, P.C.

(57) ABSTRACT

The present invention is an active optical system for beam-steering an incoming laser beam. It includes a first control optics assembly for receiving an incoming laser beam and adjusting that incoming laser beam in accordance with first desired wavelength, polarization and beam propagation parameters. A driver element produces a driver laser beam. A second control optics assembly receives the driver laser beam and adjusts that driver laser beam in accordance with second desired wavelength, polarization and beam propagation parameters. A second order non-linear optical element (SONOE) receives an output from the first control optics assembly and an output from the second control optics assembly. The SONOE provides a non-linear optical interaction between the outputs such that a propagation direction modified laser beam is provided that propagates at a different angle than the incoming laser beam and at a difference wavelength thereof. Egressing optics receives the propagation direction modified laser beam and adjusts that laser beam in accordance with desired wavelength, polarization, and beam propagation parameters, the output of the egressing optics having the laser beam propagation direction shifted relative to the incoming laser beam direction.

17 Claims, 1 Drawing Sheet

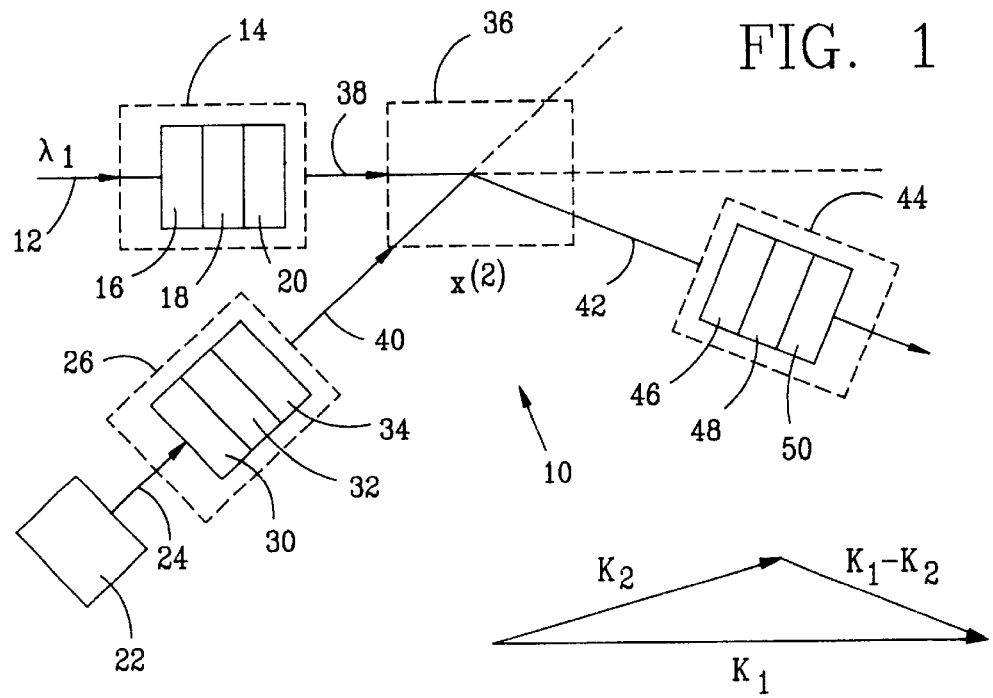
FIG. 1
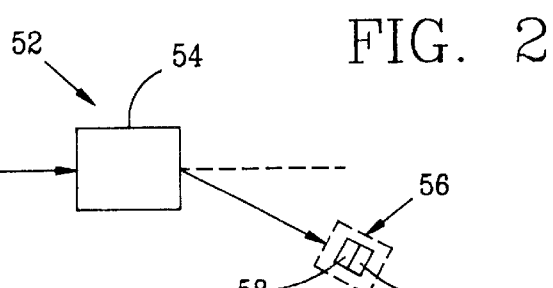
FIG. 2
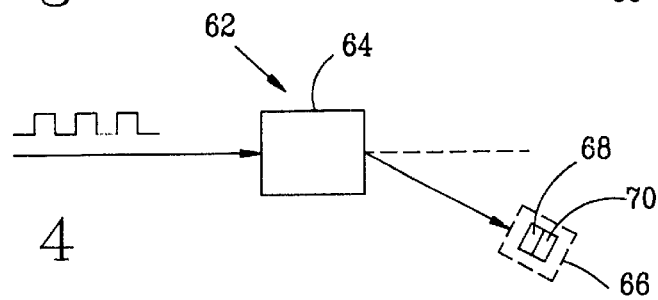
FIG. 3
FIG. 4
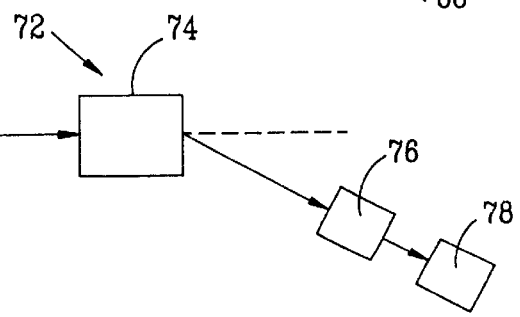
FIG. 5

ACTIVE OPTICAL SYSTEM FOR BEAM-STEERING A LASER BEAM

BACKGROUND OF THE INVENTION

1. Field of the Invention

This invention relates to active optical systems and more particularly to an active optical system for steering an incoming laser beam.

2. Description of the Related Art

Many types of optical systems require the steering of a propagating laser beam. When an image or a digitally encoded optical beam propagates through, for example, turbid media, random density fluctuations cause changes in the local index of refraction. This can lead to step-like changes in the index of refraction that a propagating beam may experience, causing a change in propagation direction, akin to the change that occurs when a laser beam enters a piece of glass. In telecommunications applications, laser beams that are exiting an optical fiber may need to be steered into one of several other optical fibers. If the beam propagation direction is not switched quickly enough, transmission will be interrupted causing a loss of data transfer. In each of these situations, a steering system can be used to return the beam to its original propagation path. Standard steering systems rely on the mechanical motion of mirrors. These systems can be made quite reliable, but are limited in their application. This is because a mechanical system has inherent speed limitations.

An early mechanical system is described in U.S. Pat. No. 4,157,861, entitled Optical Beam Steering System, issued to Kirk E. Davies. This patent discusses the use of an electromagnetically driven reflective surface on a carefully mechanically optimized mount to minimize vibration. Since the steering is performed by moving a mirror, the steering speed is limited by mechanical motion bandwidths.

An improvement on the mechanical steering concept is addressed in U.S. Pat. No. 5,067,829, entitled Dynamic Optical Beam Steering, issued to Jaskie, et. al. In this patent, optically transparent elastic materials are applied in thin films to a substrate. Application of an electric field causes mechanical distortion of the material the beam to change its propagation direction. Although an improvement, this patent still describes a mechanical system (since the layers have to physically move), thus resulting in limited speed.

Faster steering can be realized using electro-optical means to steer the beam. There have been previous patents that disclose the use of electro-optical means to perform rapid beam steering. An early electro-optic steering device is described in U.S. Pat. No. 5,420,875, Steering of Laser Beams, issued to Sternklar. In this patent, beams are steered by a third-order nonlinear optical process, the steered beam interacting with a nonlinear polarization induced in a non-linear medium by two other pumping beams. The steering effect is much faster than mechanical means, but is limited to the narrow angle defined by the pump beams. Additionally, the use of a third-order effect means that two pump beams of relatively high intensity must be used, since third-order effects are very weak.

A more recent example is described in U.S. Pat. No. 5,943,159, entitled Method and Apparatus for Optical Beam Steering, issued to Zhu. In this patent, an optical device is spatially addressed via an array of electronic connections. By manipulating the local phase of the beam, the propagation direction is changed and the beam is steered. This requires an elaborate optical array. The nature of the physical effect limits the steering to small angles. U.S. Pat. No. 6,137,926, entitled Hybrid Optical Multi-Axis Beam Steering Apparatus, issued to Maynard, discloses a mechanical system, that is much miniaturized so that it can reach speeds higher than traditional mechanical deflectors. However, it is still limited by mechanical speeds.

SUMMARY

The present invention is an active optical system for beam-steering an incoming laser beam. It includes a first control optics assembly for receiving an incoming laser beam and adjusting that incoming laser beam in accordance with first desired wavelength, polarization and beam propagation parameters. A driver element produces a driver laser beam. A second control optics assembly receives the driver laser beam and adjusts that driver laser beam in accordance with second desired wavelength, polarization and beam propagation parameters. A second order non-linear optical element (SONOE) receives an output from the first control optics assembly and an output from the second control optics assembly. The SONOE provides a non-linear optical interaction between the outputs such that a propagation direction modified laser beam is provided that propagates at a different angle than the incoming laser beam and at a difference wavelength thereof. Egressing optics receives the propagation direction modified laser beam and adjusts that laser beam in accordance with desired wavelength, polarization, and beam propagation parameters, the output of the egressing optics having the laser beam propagation direction shifted relative to the incoming laser beam direction. The present invention is all-optical, so the steering speeds are much higher than those achievable with mechanical steering. Since it results from a second-order effect, the nonlinear effect can be performed with only one driving beam instead of two. Since the physical effect that steers the beam is difference frequency generation, the phase-matching rules allow the steered beam to be directed to an almost any direction.

BRIEF DESCRIPTION OF THE DRAWINGS

FIG. 1 is a schematic view of a preferred embodiment of the active optical system of the present invention.

FIG. 2 is a schematic view of the phase vector diagram associated with the second-order nonlinear optical interaction by which steering is affected in the present invention.

FIG. 3 is a schematic view of an implementation of the present invention as an active beam-steered telescope.

FIG. 4 is a schematic view of an implementation of the present invention as an active beam-steered optical communications receiver system.

FIG. 5 is a schematic view of an implementation of the present invention as an active beam-steered microlithography system.

DETAILED DESCRIPTION OF THE INVENTION

Referring to the drawings and the characters of reference marked thereon, FIG. 1 illustrates a preferred embodiment of the present invention, designated generally as 10. An incoming laser beam 12 is received by a first control optics assembly, designated generally as 14. The laser beam, $\lambda_1$, is generally described as an electromagnetic or light beam with a single narrow wavelength in the optical regime (0.1–10 microns) which is propagating in a uniform well-defined direction, made possible by its coherence properties. The laser beam could represent an image or could be a digitally encoded optical beam for data transmission. The first control optics assembly 14 adjusts the incoming laser beam in accordance with first desired wavelength, polarization and beam propagation parameters. These parameters can include, for example, precise wavelength filtering to the expected signal wavelength, the optical bandwidth of the incoming signal, or the polarization of the light. The wavelength may be controlled to fit within the transparency range of the ensuing steerer. It may be more precisely filtered to fit a known input signal, either from an image or from a digitally encoded communication beam.

The assembly 14 preferably includes a wavelength control element 16 such as a color filter, an etalon, a Fabry-Perot interferometer, a Fizeau interferometer, a diffraction grating, or a notch filter, etc. A polarization control element 18 polarizes the wavefront. This may comprise, for example, a polarization plate, a Brewster's angle polarizer, or a thin film polarizer. The precise polarizer to be selected depends on the particular application's engineering requirements such as polarization rejection ratio, size and weight of the polarizer, and the wavelength range over which the steerer must operate, etc. The wavefront is then received by a propagation control element 20 such as a single lens, double lens, refractive elements, reflective elements or other system up to a fully engineered telescope.

A driver element 22 for encoding produces a driver laser beam 24. The driver element 22 may comprise, for example, a single frequency laser, with sufficiently high intensity to affect a nonlinear optical interaction with the incoming beam described previously. This could be a solid state laser, a high power diode laser or any number of high intensity lasers.

A second control optics assembly 26 adjusts the driver laser beam 24 in accordance with desired wavelength, polarization and beam propagation parameters. The assembly 26 preferably includes wavelength control element 30 such as a color filter, an etalon, a Fabry-Perot interferometer, a Fizeau interferometer, a diffraction grating or a notch filter. A polarization control element 32 and a propagation control element 34 are utilized, as described above.

A second order non-linear optical element (SONOE) 36 receives an output 38 from the first control optics assembly 14 and an output 40 from the second control optics assembly 26. The SONOE 36 provides a non-linear optical interaction between the outputs 38,40 such that a propagation direction modified laser beam 42 is provided that propagates at a different angle than the incoming laser beam and at a difference wavelength thereof. In order for the beam-steering phase-shifting to occur, the affected and driver beams must be physically registered in propagation space. The registration in propagation direction is achieved with appropriate timing, that is, the pulses enter the phase-shifter overlapped in time. The registration in the other two dimensions is accomplished by overlapping the physical cross-sections of the beams. The SONOE or combiner 36 allows for this overlapping in cross-section to take place. The SONOE may include, for example, a bulk single crystal material or a surface thin-film material. Examples of bulk single crystal materials include lithium-niobate, potassium dihydrogen phosphate, silver thiogallite and potassium titanium oxide phosphate. Examples of surface thin-film materials include periodically-poled lithium-niobate, periodically-poled potassium titanium oxide phosphate, and periodically-poled gallium arsenide. Each of these examples has a high second-order nonlinear response, is transparent at the incoming laser wavelength, driver wavelength and steered laser wavelength and can be made in sizes large enough to allow good efficiency in the nonlinear optical interaction.

Egressing optics 44 receives the output 42 of the SONOE 36 and adjusts that laser beam in accordance with desired wavelength, polarization, and beam propagation parameters. The output of the egressing optics has the laser beam propagation direction shifted relative to the incoming laser beam direction. Egressing optics 44 includes an egressing wavelength control element 46, an egressing propagation control element 48 and an egressing polarization control element 50.

This device has advantages over the techniques described in the prior art. This system involves an "all-optical" interaction. There is no mechanical process that occurs in the steering mechanism, so that steering speeds can be extremely high. The interaction is second-order, so that the steering process is very efficient and only requires one driving beam, whereas a third-order process requires two pump beams. The particular process, difference-frequency generation, allows the steered beam to go into any propagation direction outside the angle defined by the incoming and driving laser propagation directions. This utility is not represented in any of the previous art, as described above.

Referring now to FIG. 2, a diagram which represents the phase-matching constraints governing the second order non-linear optical interaction is illustrated. The incoming and driving lasers' propagation vectors are represented by $K_1$ and $K_2$. From the diagram, it is seen that the steered beam vector, represented by $K_3$, can have any direction outside of the angle defined by $K_1$ and $K_2$. The angle of the driving beam relative to the incoming laser as well as the length of the driving beam vector can be controlled independently by varying the propagation direction and driving laser wavelength respectively. The steered beam direction can be chosen almost arbitrarily.

This invention can be used in a number of optical applications. For example, suppose a user is imaging an object through a long distance in the atmosphere. Without a steering correction, the image may not be received by the optical receiver that is trying to ascertain what the image is. With the present active phase corrector in place, the incorrectly propagating beam can be steered back to the desired direction.

Referring now to FIG. 3, an active beam-steered telescope utilizing the inventive principles herein is illustrated, designated generally as 52. The telescope 52 includes an active optical system, as described above, designated generally as 54, and an imaging system 56. The imaging system 56 includes real image formation optics 58 in series with an optical detector 60. The real image formation optics 58 receives the output of the egressing optics of the active optical system 54 and provides a real image therefrom which is directed to the optical detector 60 for conversion of the real image to a spatially registered electronic signal. The imaging system may be, for example, an optical hardware system that forms a real image. The real image formation optics 58 may be, for example, a series of lenses or curved reflective surfaces. The optical detector 60 may be, for example, a focal plane array.

Another use of this active optical system is for long-distance optical communications. When an optical signal is received, it is introduced into an optical fiber for signal handling and processing. Unfortunately, incorrect propagation will not allow the beam to be directed into the fiber tip, so that not all of the signal will go into the fiber, causing a loss of encoded information. Propagation direction correction enables the entire optical signal to be focused into the fiber.

Referring now to FIG. 4, an active beam-steered optical communications receiver system is illustrated, designated generally as 62. The receiver system 62 includes an active optical system, as described above, designated generally as 64, and a receiver 66. The receiver 66 includes intensity collection optics 68 in series with an optical-to-electronic converter 70. Intensity collection optics 68 receives the output of the egressing optics of the active optical system 64 and provides an electronic signal having an encoding that duplicates that of the incoming encoded laser beam. The intensity collection optics 68 may be, for example, a lens that focuses the laser light to a point. The optical-to-electronic converter 70 may be, for example, a photodiode.

In optical microlithography used in semiconductor processing, it is essential to hold the laser to a small controlled local position. The environment in which the processing occurs causes huge distortions to occur and propagation correction is essential for good yields. The active optical system can be used in that environment to compensate for propagation errors that are caused there.

Referring now to FIG. 5, an active beam-steered optical microlithography system is illustrated, designated generally as 72. The microlithography system 72 includes an active optical system, as described above, designated generally as 74, and a microlithographic optical system 76. The microlithographic optical system 76 includes beam area reducing optics 78. The beam area reducing optics is in series with the semiconductor 78 to be processed. The microlithographic optical system 76 receives the output of the egressing optics of the active optical system 74 and delivers a small beam optical spot to the semiconductor 78 to be processed by lithographic techniques.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

What is claimed is:

1. An active optical system for beam-steering an incoming laser beam, comprising:
   a) a first control optics assembly for receiving an incoming laser beam and adjusting that incoming laser beam in accordance with first desired wavelength, polarization and beam propagation parameters;
   b) a driver element for producing a driver laser beam;
   c) a second control optics assembly for receiving said driver laser beam and adjusting that driver laser beam in accordance with second desired wavelength, polarization and beam propagation parameters;
   d) a second order non-linear optical element (SONOE) for receiving an output from the first control optics assembly and an output from the second control optics assembly, said SONOE providing a non-linear optical interaction between said outputs such that a propagation direction modified laser beam is provided that propagates at a different angle than the incoming laser beam and at a difference wavelength thereof;
   e) egressing optics for receiving said propagation direction modified laser beam and adjusting that laser beam in accordance with desired wavelength, polarization, and beam propagation parameters, the output of the egressing optics having the laser beam propagation direction shifted relative to the incoming laser beam direction.

2. The active optical system of claim 1, wherein said first control optics assembly, comprises: a first set of serially positioned control elements for receiving the incoming laser beam, said first set of control elements comprising a first wavelength control element, a first propagation control element and a first polarization control element, said first set of control elements providing an output to said SONOE.

3. The active optical system of claim 1, wherein said SONOE comprises a bulk single crystal material.

4. The active optical system of claim 1, wherein said SONOE comprises lithium-niobate.

5. The active optical system of claim 1, wherein said SONOE comprises potassium dihydrogen phosphate.

6. The active optical system of claim 1, wherein said SONOE comprises silver thiogallite.

7. The active optical system of claim 1, wherein said SONOE comprises potassium titanium oxide phosphate.

8. The active optical system of claim 1, wherein said SONOE comprises a surface thin-film material.

9. The active optical system of claim 1, wherein said SONOE comprises periodically-poled lithium-niobate.

10. The active optical system of claim 1, wherein said SONOE comprises periodically-poled potassium titanium oxide phosphate.

11. The active optical system of claim 1, wherein said SONOE comprises periodically-poled gallium arsenide.

12. A method for beam-steering an incoming laser beam, comprising the steps of:
   a) adjusting an incoming laser beam in accordance with first desired wavelength, polarization and beam propagation parameters;
   b) producing a driver laser beam;
   c) adjusting said driver laser beam in accordance with second desired wavelength, polarization and beam propagation parameters;
   d) constraining the adjusted incoming optical laser beam and the adjusted driver laser beam to provide a propagation direction modified laser beam that propagates at a different angle than the incoming laser beam and at a difference wavelength thereof;
   e) adjusting the combined, co-linear propagation output wavefront in accordance with desired wavelength, polarization, and beam propagation parameters, the output of the egressing optics having the laser beam propagation direction shifted relative to the incoming laser beam direction.

13. The method of claim 12, wherein said step of adjusting said incoming optical wavefront comprises: utilizing a first set of serially positioned control elements for receiving the incoming laser beam, said first set of control elements comprising a first wavelength control element, a first propagation control element and a first polarization control element, said first set of control elements providing an output to said driver element.

14. The method of claim 12, wherein said step of adjusting said incoming optical wavefront comprises: utilizing a second wavelength control element for receiving the driver optical wavefront; and, utilizing a second propagation control element for receiving the output of the second wavelength control element.

15. An active beam-steered telescope, comprising: an active optical system, comprising:
   a) a first control optics assembly for receiving an incoming laser beam and adjusting that incoming laser beam in accordance with first desired wavelength, polarization and beam propagation parameters;

b) a driver element for producing a driver laser beam;

c) a second control optics assembly for receiving said driver laser beam and adjusting that driver laser beam in accordance with second desired wavelength, polarization and beam propagation parameters;

d) a second order non-linear optical element (SONOE) for receiving an output from the first control optics assembly and an output from the second control optics assembly, said SONOE providing a non-linear optical interaction between said outputs such that a propagation direction modified laser beam is provided that propagates at a different angle than the incoming laser beam and at a difference wavelength thereof;

e) egressing optics for receiving said propagation direction modified laser beam and adjusting that laser beam in accordance with desired wavelength, polarization, and beam propagation parameters, the output of the egressing optics having the laser beam propagation direction shifted relative to the incoming laser beam direction; and an imaging system comprising real image formation optics in series with an optical detector, said real image formation optics for receiving the output of the egressing optics and providing a real image therefrom which is directed to said optical detector for conversion of said real image to a spatially registered electronic signal.

16. An active beam-steered optical communications receiver system, comprising: an active optical system, comprising:

a) a first control optics assembly for receiving an encoded incoming laser beam and adjusting that incoming laser beam in accordance with first desired wavelength, polarization and beam propagation parameters;

b) a driver element for producing a driver laser beam;

c) a second control optics assembly for receiving said driver laser beam and adjusting that driver laser beam in accordance with second desired wavelength, polarization and beam propagation parameters;

d) a second order non-linear optical element (SONOE) for receiving an output from the first control optics assembly and an output from the second control optics assembly, said SONOE providing a non-linear optical interaction between said outputs such that a propagation direction modified laser beam is provided that propagates at a different angle than the incoming laser beam and at a difference wavelength thereof;

e) egressing optics for receiving said propagation direction modified laser beam and adjusting that laser beam in accordance with desired wavelength, polarization, and beam propagation parameters, the output of the egressing optics having the laser beam propagation direction shifted relative to the incoming laser beam direction; and a receiver comprising intensity collection optics in series with an optical-to-electronic converter, said intensity collection optics for receiving the output of the egressing optics and delivering an optically encoded laser to said optical-to-electronic converter, said optical-to-electronic converter providing an electronic signal having an encoding that duplicates that of the encoded incoming laser beam.

17. An active beam-steered optical microlithography system, comprising: an active optical system, comprising:

a) a first control optics assembly for receiving an incoming laser beam and adjusting that incoming laser beam in accordance with first desired wavelength, polarization and beam propagation parameters;

b) a driver element for producing a driver laser beam;

c) a second control optics assembly for receiving said driver laser beam and adjusting that driver laser beam in accordance with second desired wavelength, polarization and beam propagation parameters;

d) a second order non-linear optical element (SONOE) for receiving an output from the first control optics assembly and an output from the second control optics assembly, said SONOE providing a non-linear optical interaction between said outputs such that a propagation direction modified laser beam is provided that propagates at a different angle than the incoming laser beam and at a difference wavelength thereof;

e) egressing optics for receiving said propagation direction modified laser beam and adjusting that laser beam in accordance with desired wavelength, polarization, and beam propagation parameters, the output of the egressing optics having the laser beam propagation direction shifted relative to the incoming laser beam direction; and a microlithographic optical system for manufacturing integrated circuit semiconductors, comprising beam area reducing optics positionable to be in series with a semiconductor to be processed, said beam area reducing optics for receiving the output of the egressing optics and delivering a small beam area optical spot to the semiconductor to by processed by lithographic techniques.

* * * * *